US009294642B2

(12) United States Patent
Kaku

(10) Patent No.: US 9,294,642 B2
(45) Date of Patent: Mar. 22, 2016

(54) IMAGE FORMING APPARATUS, OPERATION CONTROL METHOD FOR THE SAME, AND RECORDING MEDIUM

(71) Applicant: Shinya Kaku, Itami (JP)

(72) Inventor: Shinya Kaku, Itami (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/785,241

(22) Filed: Mar. 5, 2013

(65) Prior Publication Data

US 2013/0250342 A1  Sep. 26, 2013

(30) Foreign Application Priority Data

Mar. 21, 2012 (JP) ................................. 2012-064345

(51) Int. Cl.
| | |
|---|---|
| *G06K 15/00* | (2006.01) |
| *G06F 3/12* | (2006.01) |
| *H04N 1/00* | (2006.01) |
| *H04N 1/44* | (2006.01) |

(52) U.S. Cl.
CPC ....... *H04N 1/00838* (2013.01); *H04N 1/00408* (2013.01); *H04N 1/4413* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,889,370 B2* | 2/2011 | Honda | ............... | H04N 1/00347 358/1.15 |
| 8,218,165 B2* | 7/2012 | Matsushima | .......... | G03G 21/02 358/1.13 |
| 2006/0271789 A1* | 11/2006 | Satomura | ................ | G06F 21/41 713/183 |
| 2007/0127061 A1* | 6/2007 | Itagaki | ............... | H04N 1/00342 358/1.15 |
| 2008/0037052 A1* | 2/2008 | Nishiguchi | ....... | G06F 17/30011 358/1.14 |
| 2008/0088871 A1* | 4/2008 | Fukasawa | ............. | G06F 21/608 358/1.15 |

(Continued)

FOREIGN PATENT DOCUMENTS

| | | |
|---|---|---|
| JP | 2006-110863 A | 4/2006 |
| JP | 2008-129956 A | 6/2008 |

(Continued)

OTHER PUBLICATIONS

Japanese Notification of Reasons for Refusal dated Feb. 25, 2014 issued in the corresponding Japanese Patent Application No. 2012-064345 and English language translation (10 pages).

(Continued)

*Primary Examiner* — Marcus T Riley
(74) *Attorney, Agent, or Firm* — Buchanan Ingersoll & Rooney PC

(57) ABSTRACT

An image forming apparatus being capable of executing a plurality of functions comprises: an entry portion which allows a user to issue a request for using any one of the functions and enter user authority information; a display portion; an authenticator which: requires user authentication via a user authentication screen displayed on the display portion; and judges whether or not the user authority information entered via the entry portion is appropriate for an authorized user for the function; and a function execution controller which executes the function as requested, if the authenticator judges that the user authority information entered via the entry portion is appropriate for an authorized user for the function, wherein the authenticator resets the result of the user authentication if the function execution controller successfully finishes executing the function.

14 Claims, 6 Drawing Sheets

(56) References Cited

U.S. PATENT DOCUMENTS

| | | | |
|---|---|---|---|
| 2008/0192289 A1* | 8/2008 | Honda | G06F 21/608 358/1.15 |
| 2009/0055903 A1 | 2/2009 | Inose | |
| 2009/0100515 A1 | 4/2009 | Masui | |
| 2009/0213423 A1* | 8/2009 | Kusakabe | G06F 21/608 358/1.15 |
| 2009/0307767 A1* | 12/2009 | Semba | G06F 21/34 726/18 |
| 2010/0067037 A1* | 3/2010 | Takiyama | G06F 21/32 358/1.14 |
| 2010/0128298 A1* | 5/2010 | Matsugashita | G06F 3/1204 358/1.13 |
| 2010/0134244 A1 | 6/2010 | Yoshida | |
| 2010/0214600 A1* | 8/2010 | Yagi | G06F 21/34 358/1.15 |
| 2011/0020026 A1* | 1/2011 | Yoshihara | G03G 15/50 399/80 |
| 2011/0228311 A1* | 9/2011 | Oguma | G06F 21/305 358/1.14 |
| 2012/0120451 A1* | 5/2012 | Ikegami | G06F 21/608 358/1.15 |

FOREIGN PATENT DOCUMENTS

| | | |
|---|---|---|
| JP | 2008-283237 A | 11/2008 |
| JP | 2009-053762 A | 3/2009 |
| JP | 2009-100020 A | 5/2009 |
| JP | 2009-271751 A | 11/2009 |
| JP | 2010-033182 A | 2/2010 |
| JP | 2010-134549 A | 6/2010 |
| JP | 2011-037161 A | 2/2011 |
| JP | 2011-227817 A | 11/2011 |

OTHER PUBLICATIONS

Japanese Decision for Patent Grant dated Nov. 12, 2014 issued in the corresponding Japanese Patent Application No. 2012-064345 and English language translation (6 pages).

* cited by examiner

IMAGE FORMING APPARATUS, OPERATION CONTROL METHOD FOR THE SAME, AND RECORDING MEDIUM

This application claims priority under 35 U.S.C. §119 to Japanese Patent Application No. 2012-064345 filed on Mar. 21, 2012, the entire disclosure of which is incorporated herein by reference in its entirety.

BACKGROUND OF THE INVENTION

1. Field of the Invention

The present invention relates to: an image forming apparatus such as a multifunctional digital machine called a multifunction peripheral (MFP) having various functions such as copier, printer, facsimile, and scanner function; an operation control method for the image forming apparatus; and a non-transitory computer-readable recording medium with an operation program being stored thereon.

2. Description of the Related Art

The following description sets forth the inventor's knowledge of related art and problems therein and should not be construed as an admission of knowledge in the prior art.

Some MFPs as described above are allowed to implement their functions only after having various applications installed thereon. In other words, installing an application program (also referred to as application, simply) enables such an MFP, having various functions such as copier and printer functions, to use application-based features of their functions, which are different from regular features of their functions, by cooperative work between the functions and the application.

Such an MFP can give users or business sections use authorities to the functions thereof. Naturally, the users or business sections are required to have their own authorities to the functions in order to use application-based features of the functions. Conventionally, once a user is successfully logged on to the MFP through user authentication by the application, the MFP allows any users to use the application-based features of the functions within the range of the authority of the logon user.

That is, for example, an authorized user for color copy, having been successfully logged on to the MFP possibly may leave the MFP for a while without logging off; even an unauthorized user can perform color copy on behalf of the authorized user during his/her absence, which may cause a problem.

Furthermore, an authorized user may possibly ask an unauthorized user to use only a particular function (color copy, for example) for some reason while being logged on to the MFP; the unauthorized user can also use other functions on behalf of the authorized user without his/her agreement, which also may cause a problem.

Japanese Unexamined Patent Publication No. 2009-053762 discloses a technique making user operation less trouble by requiring user authorization only once for a workflow, when a plurality of apparatuses cooperatively perform various operations in accordance with the workflow.

Japanese Unexamined Patent Publication No. 2008-129956 discloses a technique provided with: a first authenticator which performs department authentication on the department of a user who intends to access an image forming apparatus; and a second authenticator which performs individual authentication on the user himself/herself. In this technique, the user is permitted to use all functions of the image forming apparatus if the second authenticator identifies him/her as being authorized; the user is permitted to use only basic functions among all the functions if the first authenticator identifies his/her department as being authorized.

However, the technique described in Japanese Unexamined Patent Publication No. 2009-053762 does not achieve the prevention of unauthorized use by a third person, because in this technique, the authority of an authorized user is effective while the workflow is active.

The technique described in Japanese Unexamined Patent Publication No. 2008-129956 does not achieve the prevention of unauthorized use by a third person neither, because in this technique, even an unauthorized user can use not only basic functions but also all the functions while an authorized user is logged on.

Therefore, Japanese Unexamined Patent Publications No. 2009-053762 and No. 2008-129956 and any other conventional techniques do not solve the problem that even an unauthorized user can use functions of an MFP on behalf of an authorized user after the authorized user leaves the MFP without logging off.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The present invention with the technical background described above has been made to introduce: an image forming apparatus which can prevent any unauthorized user from using a function of the image forming apparatus itself improperly while an authorized user is away without logging off; an operation control method for the image forming apparatus; and a recording medium with an operation control program being stored thereon to make a computer of the image forming apparatus execute processing by the operation control method.

A first aspect of the present invention relates to an image forming apparatus being capable of executing a plurality of functions, the image forming apparatus comprising:

an entry portion which allows a user to issue a request for using any one of the functions and enter user authority information;

a display portion;

an authenticator which: requires user authentication via a user authentication screen displayed on the display portion; and judges whether or not the user authority information entered via the entry portion is appropriate for an authorized user for the function; and a function execution controller which executes the function as requested, if the authenticator judges that the user authority information entered via the entry portion is appropriate for an authorized user for the function, wherein the authenticator resets the result of the user authentication if the function execution controller successfully finishes executing the function.

A second aspect of the present invention relates to an operation control method for an image forming apparatus being capable of executing a plurality of functions, the operation control method comprising:

allowing a user to issue a request for using any one of the functions and enter user authority information;

requiring user authentication via a user authentication screen displayed on a display portion and judging whether or not the user authority information entered by the user is appropriate for an authorized user for the function; and executing the function as requested, if it is judged that the user authority information entered by the user is appropriate for an authorized user for the function, wherein the result of the user authentication is reset if execution of the function is successfully finished.

A third aspect of the present invention relates to a non-transitory computer-readable recording medium with an operation control program being stored thereon to make a computer of an image forming apparatus being capable of executing a plurality of functions execute:

allowing a user to issue a request for using any one of the functions and enter user authority information;

requiring user authentication via a user authentication screen displayed on a display portion and judging whether or not the user authority information entered by the user is appropriate for an authorized user for the function; and executing the function as requested, if it is judged that the user authority information entered by the user is appropriate for an authorized user for the function, wherein the result of the user authentication is reset if execution of the function is successfully finished.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
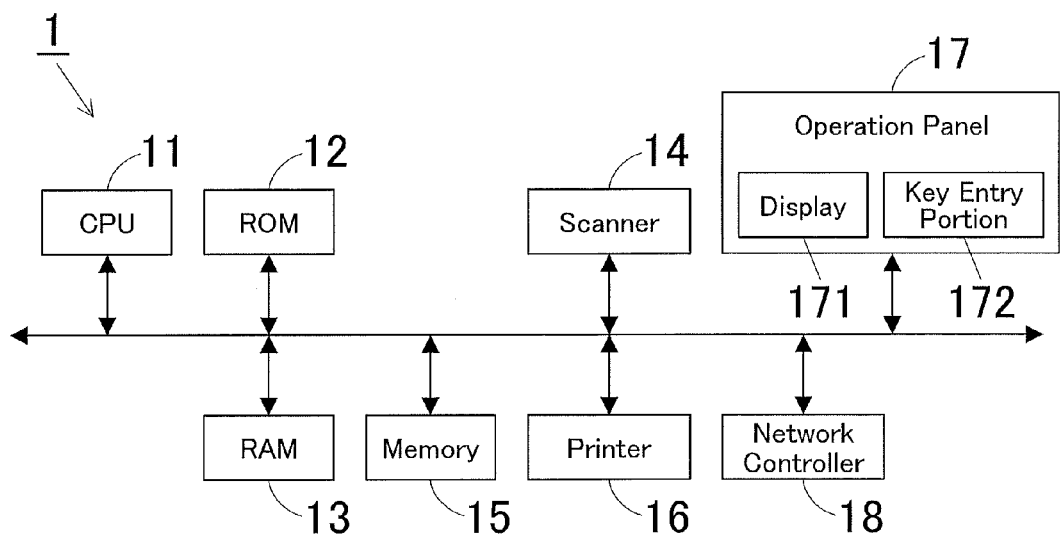
FIG. 1 is a block diagram illustrating an electrical configuration of an image forming apparatus according to one embodiment of the present invention.

FIG. 1 is a block diagram illustrating an electrical configuration of an image forming apparatus 1 according to one embodiment of the present invention.

In this embodiment, an MFP, which is a multifunctional digital image forming apparatus having a plurality of functions such as copier, printer, scanner, and facsimile function as described above, is employed as the image forming apparatus 1. The image forming apparatus 1 is provided with a CPU 11, a ROM 12, a RAM 13, a scanner 14, a memory 15, a printer 16, an operation panel 17, a network controller (NIC) 18, and the like.

The CPU 11 controls the entire image forming apparatus 1 in a unified and systematic manner such that basic functions of the image forming apparatus 1 such as copier, printer, scanner, and facsimile function can be used.

The ROM 12 is a memory storing operation programs and the like for the CPU 11.

The RAM 13 provides a work area for the CPU 11 to execute processing in accordance with an operation program.

The scanner 14 reads a document placed on a platen (not illustrated in this Figure) to output an image read out from the document.

The memory 15, which is composed of a non-volatile recording medium such as a hard disk drive (HDD), stores various application programs; images read out from a document by the scanner 214; and data received externally from another image forming apparatus or a user terminal, for example.

The printer 16 prints out an image read out from a document by the scanner 14, print data received from a user terminal, and the like on the basis of a specified mode.

The operation panel 17, which is used for various entry operations, is provided with: a display 171 composed of a liquid crystal display 171 with touch-panel functionality, displaying messages, operation screens, and the like; and a key entry portion 172 including numeric keys, a Start key, a Stop key, and the like.

The network controller 18 externally transmits and receives data to and from image forming apparatuses and other apparatuses such as user terminals via a network, by controlling communications with them.

Figure 2:
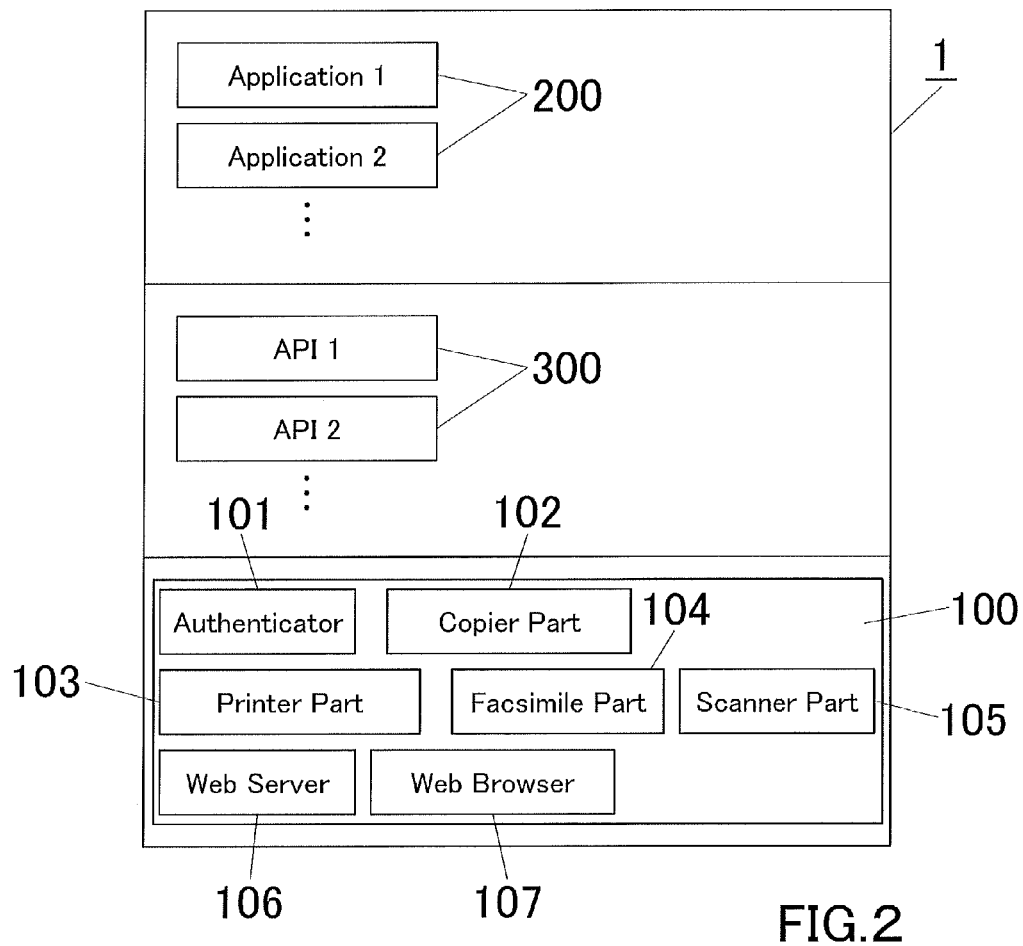
FIG. 2 illustrates a configuration of functions of the image forming apparatus of FIG. 1.

FIG. 2 illustrates a configuration of functions of the image forming apparatus 1.

As illustrated in FIG. 2, the code 100 indicates a core consisting of a firmware. The core is provided with: an authenticator 101; a functions implementation part which implements the functions of a copier part 102, a printer part 103, a facsimile part 104, and a scanner part 105; a web server part 106; a web browser 107; and the like, functionally.

The code 200 indicates a plurality of applications installed on the image forming apparatus 1. In this embodiment, these applications have been developed by third parties each of which is not the manufacturer of the image forming apparatus 1. These applications are, for example: a copier application, an accounting application, a pull-printing enabled application, and the like.

The code 300 indicates one or more application program interfaces (APIs) which deliver instructions from the applications 200 to the core 100.

Hereinafter, operations of the image forming apparatus 1 of FIG. 1 will be described.

In this example, the image forming apparatus 1 defines the following three use authorities [1], [2], and [3], for the functions of the image forming apparatus 1.

[1] Public User: public users are unidentified third persons. They are prohibited from using color copy, N-in-1 copy for imposing N pages on one sheet of paper, and email transmission.

[2] Regular User: regular users are permitted to use color copy and email transmission, but prohibited from any operations to memory areas, Boxes (Box operations).

[3] Power User: power users are not prohibited from using any functions (they are permitted to use all functions including email transmission and Box operations).

In this example, a copier application is installed on the image forming apparatus 1 as one of the applications 200. The copier application basically enables copy-making as well as email communication.

After accessing the application 200 (copier application) via a browser screen displayed on the display 171 of the operation panel 17, a public user, who is an unidentified third person, issues a request to allow using color copy (also referred to as request for color copy, or simply, copy request) by operating the image forming apparatus 1, and the color copy request is accepted by the application 200.

The application 200 transfers the request for color copy to the core 100 by way of any API 300.

If public users are not permitted to use color copy, the core 100 makes the display 171 of the operation panel 17 show a user authority information entry screen for user authentication along with a message stating "please enter your user authority information to prove your authority for color copy".

The user enters his/her user authority information via the user authority information entry screen, then the core 100 examines the authority of the user. More specifically, the core 100 judges whether or not the entered user authority information is appropriate for an authorized user; i.e., the user identified by the entered user authority information has an authority for color copy. All users' use authority information, including this user's authority for color copy, is recorded in advance on the memory 15 by administrator users or the like.

If he/she is successfully identified as being authorized, the core 100 makes the printer part perform color copy as requested. If he/she is not identified as being authorized, the core 100 does not make the printer part perform color copy only rejecting the request for color copy. At the same time, the core 100 may also make the display show the user authority information entry screen for user authentication.

After the judgment, the core 100 transmits a notice of "copy finished" or "unauthorized user" to the application 200. Receiving the notice therefrom, the application 200 makes the display 171 show a message stating that the user finished using color copy or is not an authorized user.

Now a power user A logs on to the image forming apparatus 1 to use the application 200 (copier application). The power user A has an authority for all functions. Therefore, while the power user A is logged on, all the functions are available to any users. That is, the power user A may possibly leave the image forming apparatus 1 for a while without logging off; even a third person with malicious intent can use all the functions on behalf of the power user A during his/her absence, which may cause a problem. Furthermore, the power user A may possibly ask an unauthorized user to use only a particular function for some reason while being logged on to the image forming apparatus 1; the unauthorized user can also use other functions on behalf of the power user A without his/her agreement, which also may cause a problem.

Furthermore, the application 200 may possibly include a program with malicious intent, forever keeping the power user A being logged on to the image forming apparatus, which also may cause a problem.

In this embodiment to be described below, a request for permitting to use a function is transmitted to one of the applications 200, which is relevant with this function. Specifically, in this embodiment, public users are permitted to use black and white and single-sided copy despite their authority which is most limited. That is, any users, even unauthorized users, can specify preferred image quality and number of copies then use black and white and single-sided copy based on these settings.

Figure 3:
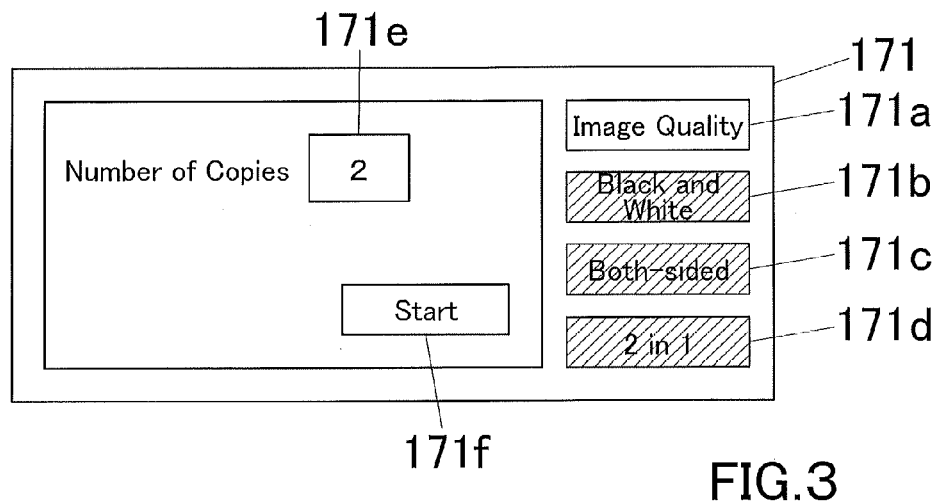
FIG. 3 illustrates a copy mode setting screen to appear on a display by a copy application.

This will be more specifically described hereinbelow with reference to a copy mode setting screen of FIG. 3, which appears on the display 17 by the application 200 (copy application). Via the copy mode setting screen, a user enters a value in an entry field for number of copies 171e and adjusts image quality with an image quality button 171a. Then, the user starts copy by pressing a Start button 171f. In this screen, there are also a color copy button 171b for switching the mode to color copy; a double-sided copy button 171c for switching the mode to double-sided copy; and an imposition button 171d for imposing two pages on one sheet of paper, all of which relate to functions allowed for authorized users only. These buttons are shaded in FIG. 3, obviously indicating that the user is not permitted to use the functions.

Figure 4:
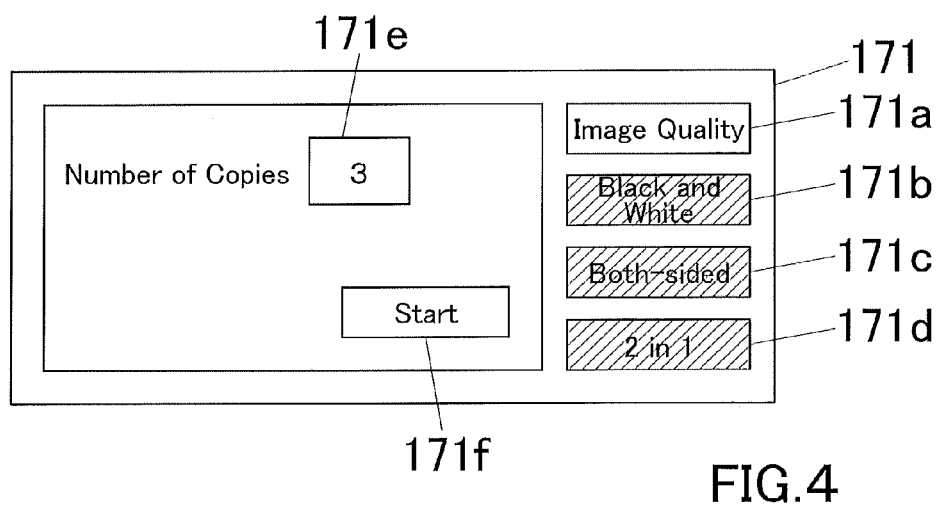
FIG. 4 illustrates a copy mode setting screen to appear when a user selects color copy mode.

To perform a combination of color, double-sided, and 2-in-1 copy, the user presses the color copy button 171b, the double-sided copy button 171c, and the imposition button 171d, respectively. For example, the user presses the color copy button 171b to perform color copy. And the "Black and White" indication of the button then changes to "Color" as illustrated in FIG. 4, allowing the user to know that the color copy setting has been successfully completed.

And the user further presses the Start button 171f, thereby a request for color copy is accepted by the application 200 along with the user's settings, and transferred to the core 100 by way of an API 300.

For example, the following series of commands:

job=mfp.job.copy( )
job.set_color(color)
job.set_condition(any)
ng=job.start( )

will be transferred from the application 200 to the core 100 by way of the API 300.

In this series of commands, "job.set_color(color)" indicates that the request relates to a color copy job; "job.start( )" is an instruction to start the copy job.

Figure 5:
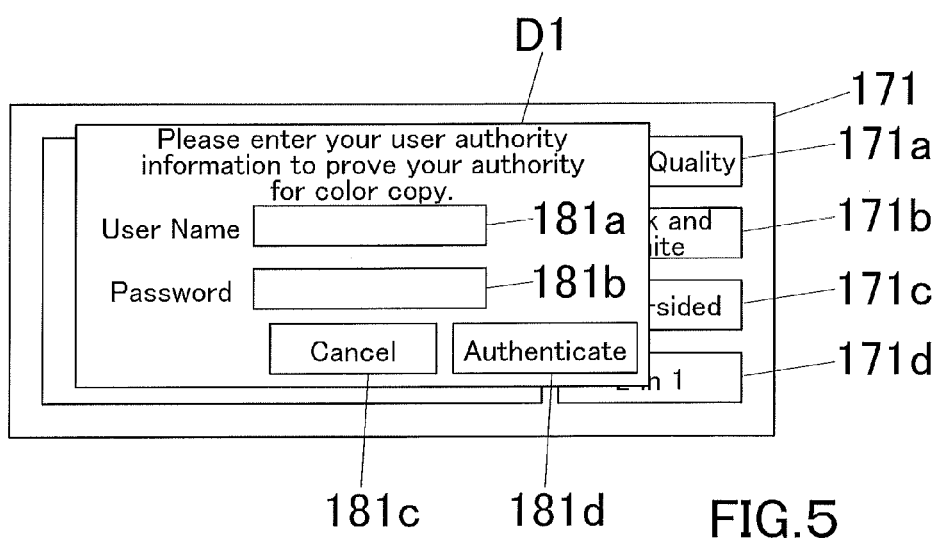
FIG. 5 illustrates an example of a user authority information entry screen to appear on the display.

Receiving the series of commands, the core 100 makes the display 171 of the operation panel 17 show an user authority information entry screen D1 as illustrated in FIG. 5. In the user authority information entry screen D1, an entry field for user name 181a and an entry field for password 181b in which to enter user authority information, a Cancel button 181c, and an Authenticate button 181d are displayed along with a message stating "please enter your user authority information to prove your authority for color copy".

In this embodiment, the application 200 transfers a series of commands by a user's pressing the Start button 171f; receiving this series of commands, the core 100 makes the display 171 show the user authority information entry screen D1. Alternatively, the user authority information entry screen D1 may be displayed thereon by a user's pressing any one of the color copy button 171b, the double-sided copy button 171c, and the composition button 171d, simply. However, it is preferred that the user authority information entry screen D1 be displayed thereon by the user's pressing the Start button 171*f*, for the convenience of users. That is because, after pressing any one of the color copy button 171*b*, the double-sided copy 171*c*, and the composition button 171*d*, the user may change his/her mind to the original setting, black and white and single-sided copy.

After entering his/her user name and password via the user authority information entry screen D1, the user presses the Authenticate button 181*d*. And user authentication is started by the core 100. The user authority information entry screen D1 disappears by the user's pressing the Cancel button 181*c*. In addition to the Authenticate button 181*d* and the Cancel button 181*c*, there may be a Skip button in the user authority information entry screen D1. The user can skip user authentication by pressing the Skip button, being automatically identified as a public user who is permitted to use only black and white copy.

If the user is not identified as being authorized, a notice of "unauthorized user" is returned to the application 200 by the core 100. If the user is successfully identified as being authorized, color copy is performed, and a notice of "copy finished" is then returned to the application 200 by the core 100. Receiving the notice therefrom, a message stating that the user finished using color copy or is not an authorized user is displayed on the display 171 by the application 200.

Figure 6:
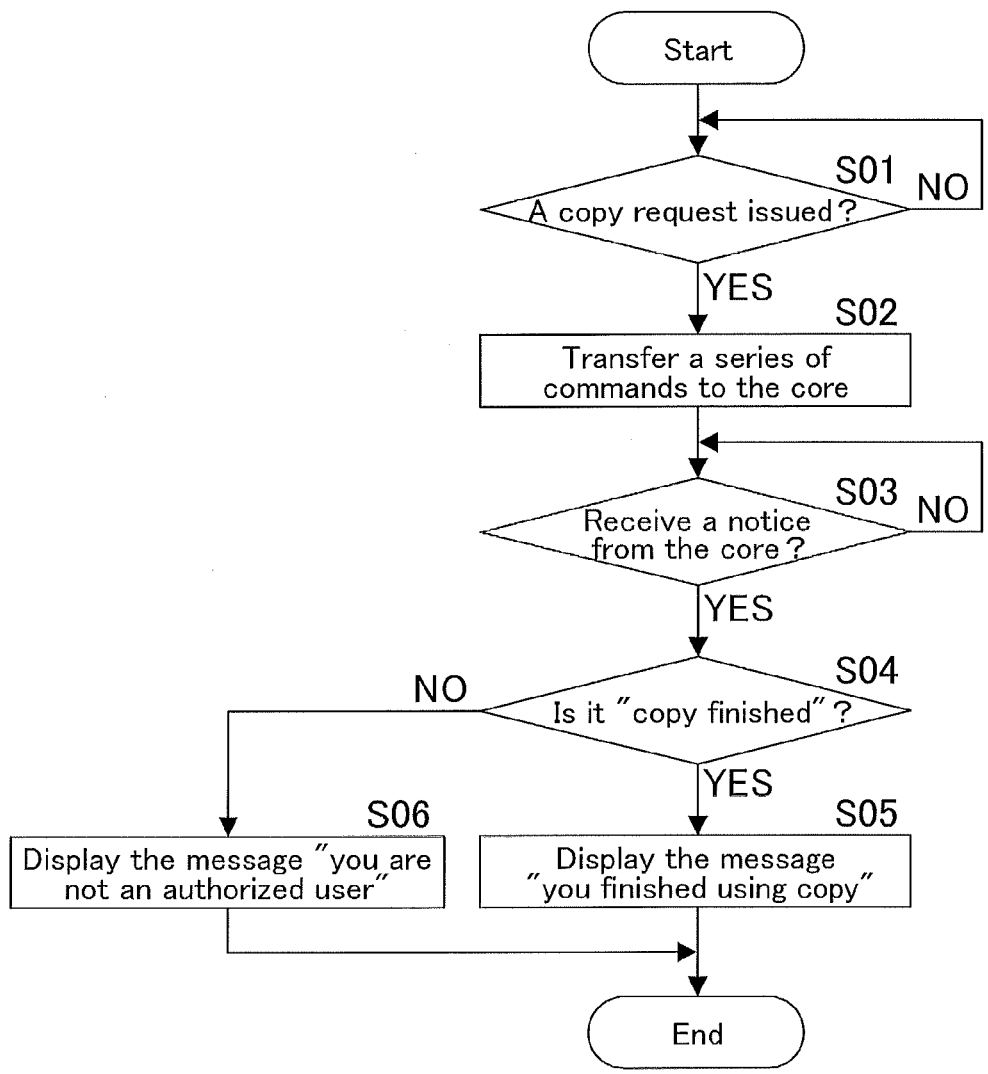
FIG. 6 is a flowchart representing operations to be performed by the copy application.

FIG. 6 is a flowchart representing operations to be performed by the application 200; the routine is executed by the CPU 11 in accordance with an application program stored on a recording medium such as the ROM 12.

In Step S01, it is judged whether or not a copy request is issued by the user. If a copy request is not issued (No in Step S01), the routine waits until it is issued. If a copy request is issued (YES in Step S01), a series of commands indicating a copy request is transferred to the core 100 in Step S02.

Subsequently, the routine waits until a notice of "unauthorized user" or "copy finished" is received from the core 100 in Step S03. If such a notice is received (YES in Step S03), the routine proceeds to Step S04.

In Step S04, it is judged whether or not it indicates "copy finished". If it indicates "copy finished" (YES in Step S04), a message stating that the user finished using copy is displayed on the display 171 in Step S05. Then the routine terminates. If it indicates "unauthorized user" (No in Step S04), a message stating that the user is not an authorized user is displayed on the display 171 in Step S06. Then the routine terminates.

Figure 7:
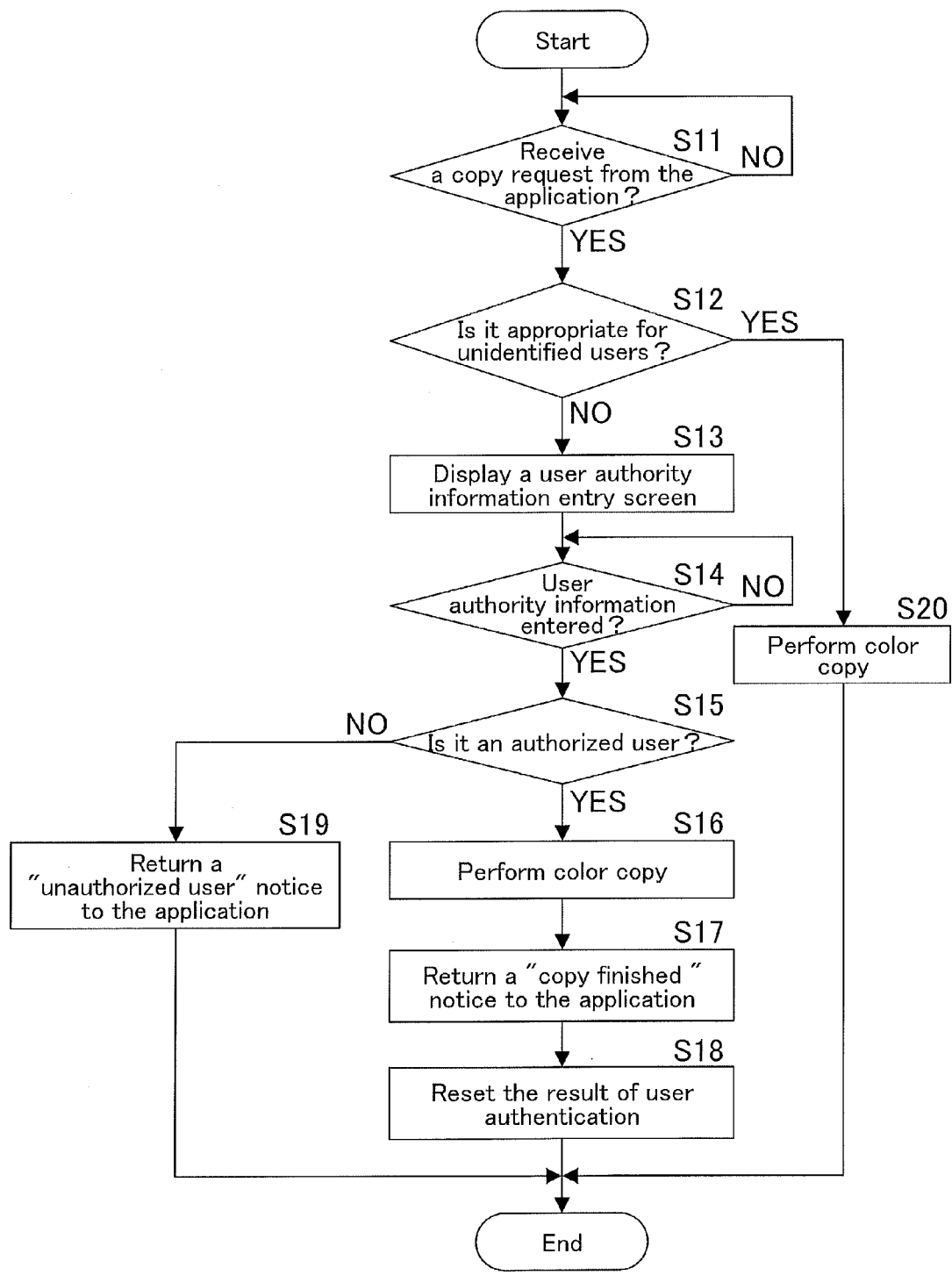
FIG. 7 is a flowchart representing operations to be performed by a core of the image forming apparatus.

FIG. 7 is a flowchart representing operations to be performed by the core 100 of the image forming apparatus 1. This routine is executed by the CPU 11 in accordance with an operation program stored on a recording medium such as the ROM 12.

In Step S11, the routine waits until a copy request is received from the application 200 by way of the API 300. If a copy request is received (YES in Step S11), then it is judged in Step S12 whether or not the copy request is appropriate for unidentified users (public users). In order to judge whether or not the copy request is appropriate for unidentified users, i.e., whether or not user authentication is required to accept the copy request, it is only necessary to search the information stored on a recording medium in advance such as the memory 15.

If the copy request is appropriate for unidentified users (YES in Step S12), copy is performed in Step S20 since user authentication is not required. Then the routine terminates. If the copy request is not appropriate for unidentified users (No in Step S12), the user authority information entry screen D1 is displayed on the display 171 of the operation panel 17 in Step S13 since user authentication is required. Then in Step S14, it is judged whether or not user authority information is entered for user authentication.

If user authority information is not entered yet (No in Step S14), the routine waits until it is entered. If it is entered (YES in Step S14), then it is judged in Step S15 whether or not the user is identified as being authorized, i.e., the user has an authority for color copy.

If the user is not identified as being authorized (No in Step S15), a notice of "unauthorized user" is returned to the application 200 in Step S19. Then the routine terminates. If the user is identified as being authorized (YES in Step S15), color copy is performed as requested in Step S16, and a notice of "copy finished" is then returned to the application 200 in Step S17. Then the routine terminates. The result of user authentication is reset in Step S18, then the routine terminates.

As described above, the result of user authentication is always reset after requested copy is finished; Steps S11 to S20, in which user authentication is required depending on conditions, are performed every time a user issues a copy request. Therefore, even if an unauthorized third person issues another request for color copy after an authorized user finishes using color copy, user authentication is automatically performed and he/she will hardly be able to use color copy, achieving the prevention of unauthorized use.

Figure 8:
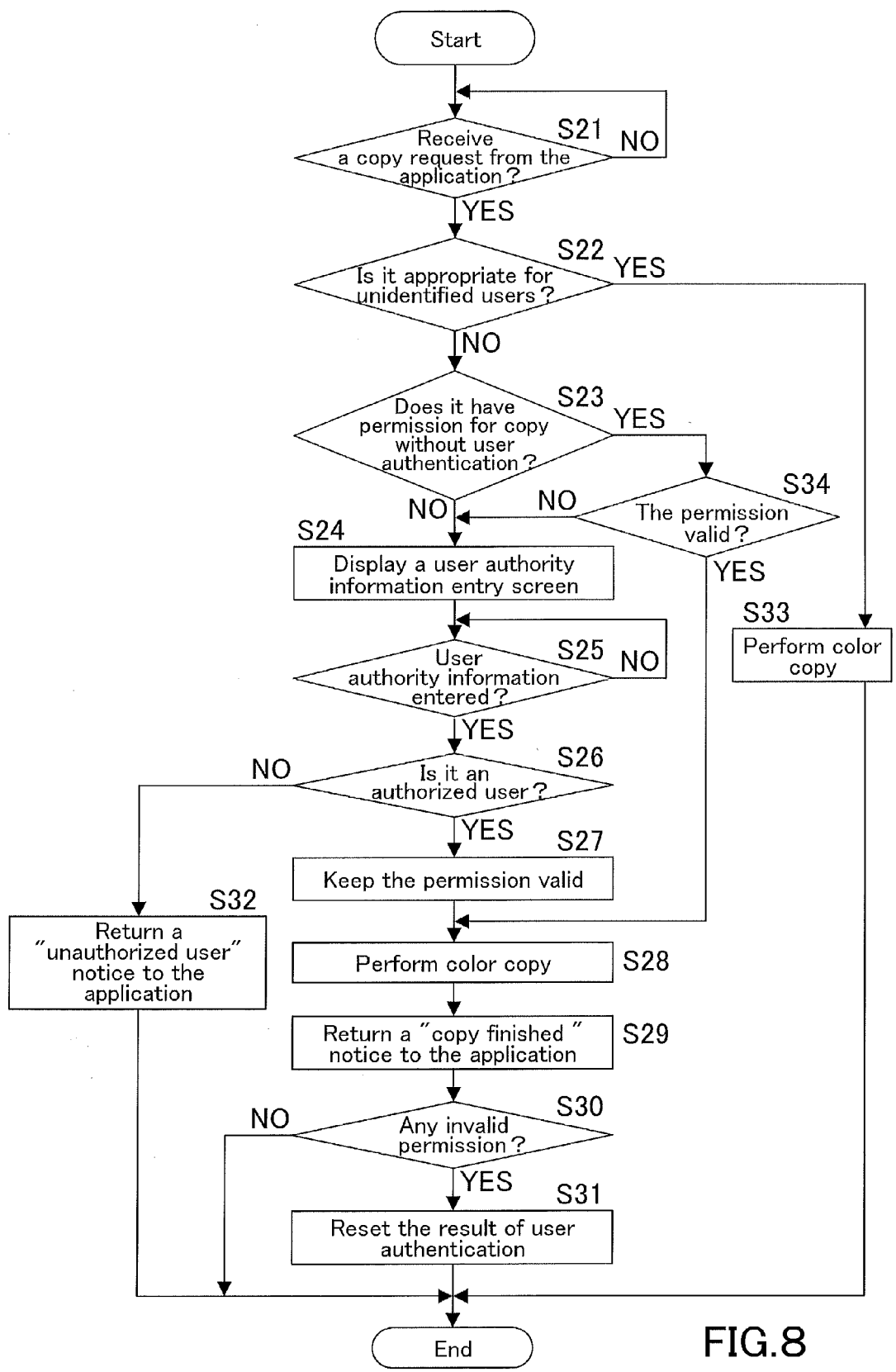
FIG. 8, which relates to another embodiment of the present invention, is a flowchart representing operations to be performed by the core of the image forming apparatus.

Hereinafter, another embodiment of the present invention will be described with reference to a flowchart of FIG. 8.

In the embodiment of FIG. 7, user authentication is automatically performed every time a user issues a request for color copy, and the result of user authentication is always reset after the requested color copy is finished. Multiple requests for color copy may be accepted one after another; in such a case, user authentication is automatically performed at each of the requests.

As a matter of course, one single user may issue multiple requests for color copy one after another; in such a case, this user is required to be identified again and again, which is very troublesome. Obviously, it is preferred that users be required to be identified only once for the convenience of users.

In this embodiment, a user having issued multiple requests for color copy one after another is required to be identified only once at his/her first request, contributing to the improvement of the convenience of users. The routine, which is represented by the flowchart of FIG. 8, is executed by the CPU 11 in accordance with an operation program stored on a recording medium such as the ROM 12.

In Step S21, the routine waits until a copy request is received from the application 200 by way of the API 300. If a copy request is received (YES in Step S21), then it is judged in Step S22 whether or not the copy request is appropriate for unidentified users (public users).

If the copy request is appropriate for unidentified users (YES in Step S22), copy is performed in Step S33 since user authentication is not required. Then the routine terminates. If the copy request is not appropriate for unidentified users (No in Step S22), then it is judged in Step S23 whether or not the copy request has continuous permission for copy without user authentication.

If the copy request has continuous permission for color copy without user authentication (YES in Step S23), then it is further judged in Step S34 whether or not the continuous permission is valid. If the continuous permission is valid (YES in Step S34), color copy is performed in Step S28. If the continuous permission is not valid (No in Step S34), the routine proceeds to Step S24.

In Step S24, the user authority information entry screen D1 is displayed on the display 171 of the operation panel 17.

Then in Step S25, it is judged whether or not user authority information is entered for user authentication.

If user authority information is not entered yet (No in Step S25), the routine waits until it is entered. If it is entered (YES in Step S25), then it is judged in Step S26 whether or not the user is identified as being authorized.

If the user is not identified as being authorized (No in Step S26), a notice of "unauthorized user" is returned to the application 200 in Step S32. Then the routine terminates. If the user is successfully identified as being authorized (YES in Step S26), the continuous permission for color copy is kept valid by not resetting the result of user authentication in Step S27. In general, keeping the continuous permission valid many times or for a long period of time could raise the risk of unauthorized use by a third person. Therefore, in this embodiment, the continuous permission is kept valid as many times as specified or for a specified period of time. If the continuous permission runs out of the specified number of times or the specified period of time, it is judged that the continuous permission is not valid in Step S30.

After color copy is finished in Step S28, a notice of "copy finished" is returned to the application 200 in Step S29.

Then in Step S30, it is judged whether or not there is any continuous permission having run out of the specified number of times or the specified period of time, i.e., there is any invalid continuous permission. If there is (YES in Step S30), the result of user authentication on which the continuous permission is based is reset in Step S31. Then the routine terminates. If there is no invalid continuous permission (No in Step S30), the routine immediately terminates.

As described above, in this embodiment, an authorized user for color copy can use color copy without additional user authentication as long as his/her request has valid continuous permission for color copy. What is more, the same is true even while operating any other application than the copy application, for example, a ledger print application. As a matter of course, he/she cannot use a function other than color copy without additional user authentication even if his/her request has valid continuous permission for color copy. For example, an authorized user for a combination of color and double-sided copy cannot use a combination of color and 2-in-1 copy without additional user authentication, which is because he/she is not authorized for 2-in-1 copy yet and his/her request should not have valid continuous permission for 2-in-1 copy. Therefore, in order to use this new combination, he/she is required to be identified as being authorized again. In general, pull printing requires a combination of printer function and the function of obtaining print data externally; scan-to-mail, which is equal to transferring a scanned image to a particular email address, requires a combination of scanner function and email transmission. The authorized user cannot use these combinations without additional user authentication; in order to use them, he/she is required to be identified as being authorized again.

Hereinafter, yet another embodiment of the present invention will be described.

In this embodiment, when a request for color copy is issued, a one-time password, which is valid for only one use, is generated, enhancing the prevention of unauthorized use by a third person.

A user issues a request for color copy by operating the application 200, and the application 200 transfers the request to the core 100. The core 100 returns thereto a one-time token while making the display 171 show a screen for user authentication.

The user enters his/her user authority information via the screen, and the application 200 transfers the one-time token and the user authority information to the core 100 of the image forming apparatus 1.

The core 100 performs user authentication on the basis of the information received therefrom. If the user is successfully identified as being authorized, the core 100 generates a one-time password to give it to the application 200.

The application 200 again transfers the request for color copy to the core 100, along with the one-time password this time, and the core 100 makes the printer part perform color copy.

A one-time password which is valid for only one use is used in this embodiment. Instead of this, a one-time password which is valid for more than one use may be used. Alternatively, a terminable password which is valid for only a specified period of time may be used.

If a request for a function other than color copy is issued after generation of a one-time password for color copy, it is preferred that the one-time password be terminated and a new one-time password be generated in place of it.

Figure 9:
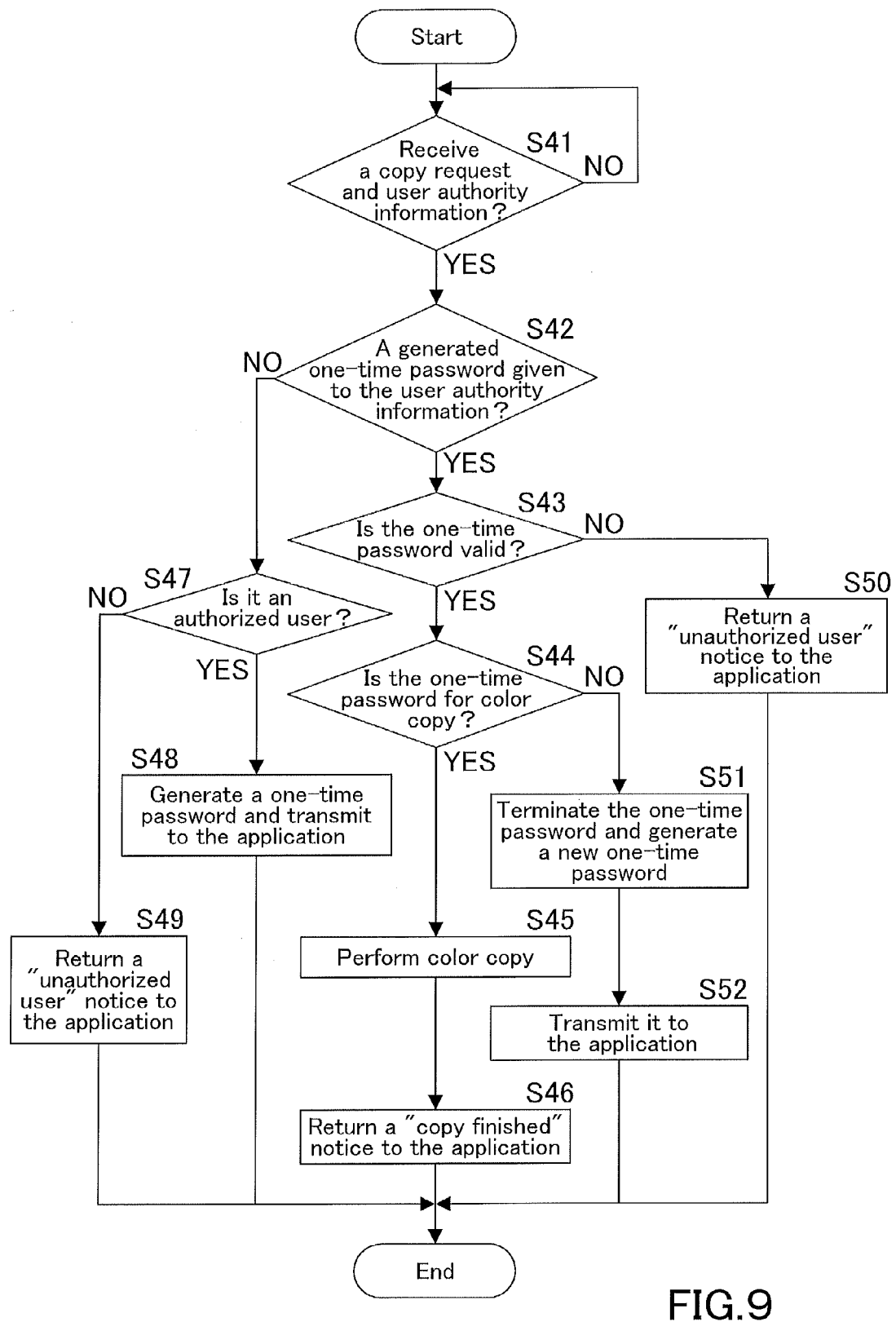
FIG. 9, which relates to yet another embodiment of the present invention, is a flowchart representing operations to be performed by the core of the image forming apparatus.

FIG. 9 is a flowchart representing operations of the core 100, such that a one-time password enables authorized use of color copy. The routine, which is represented by the flowchart of FIG. 9, is executed by the CPU 11 in accordance with an operation program stored on a recording medium such as the ROM 12.

In Step S41, the routine waits until a request for color copy and user authority information are received from the application 200 by way of the API 300. If a request for color copy and user authority information are received (YES in Step S41), then it is judged in Step S42 whether or not a generated one-time password is given to the user authority information. In this embodiment, the one-time password is valid for more than one use. If there are any one-time passwords having been used previously in this user's log, one of them is automatically given to the user authority information.

If a one-time password is given to the information received therefrom (YES in Step S42), then it is judged in Step S43 whether or not the one-time password is valid. If it is not valid (No in Step S43), a notice of "invalid password" is returned to the application 200. Receiving this notice, the application 200 makes the display show a message stating that the password is invalid. And the user has to start the operation all over again.

If the one-time password is valid (YES in Step S43), then it is judged in Step S44 whether or not the one-time password is for the requested function (color copy). If it is for color copy (YES in Step S44), color copy is performed in Step S45, and a notice of "copy finished" is then transmitted to the application 200 in Step S46. If it is not for color copy (No in Step S44), the routine proceeds to Step S51, in which the one-time password is terminated and a new one-time password is generated in place of it. And the new one-time password is then transmitted to the application 200.

Back to Step S42, if a one-time password is not given to the information received therefrom (No in Step S42), then it is judged in Step S47 whether or not the user is identified as being authorized.

If the user is not identified as being authorized (No in Step S47), a notice of "unauthorized user" is returned to the application 200 in Step S49. If the user is identified as being authorized (YES in Step S47), a one-time password for color copy is generated and transmitted to the application 200 in Step S48.

Some embodiments of the present invention have been described in the foregoing specification, which does not mean that the present invention shall be construed as limited to the particular forms disclosed.

For example, a user issues a request for color copy in these embodiments. Instead of this, a user may issue a request for a function such as printing or facsimile transmission.

Furthermore, user authentication is performed by the core 100 in these embodiments. Instead of this, it may be performed by the application 200. Actually, it would be a lot of trouble to store an appropriate program for each of the applications 200. Consequently, it is preferred that the core 100 perform user authentication.

The present invention having been described above may be applied to the following modes.

[1] An image forming apparatus being capable of executing a plurality of functions, the image forming apparatus comprising: an entry portion which allows a user to issue a request for using any one of the functions and enter user authority information; a display portion; an authenticator which: requires user authentication via a user authentication screen displayed on the display portion; and judges whether or not the user authority information entered via the entry portion is appropriate for an authorized user for the function; and a function execution controller which executes the function as requested, if the authenticator judges that the user authority information entered via the entry portion is appropriate for an authorized user for the function, wherein the authenticator resets the result of the user authentication if the function execution controller successfully finishes executing the function.

[2] The image forming apparatus as recited in the aforementioned mode [1], having a first function which unidentified users are permitted to use; and a second function which only identified users are permitted to use, wherein when a request for using the second function is issued via the entry portion, the user authentication screen is displayed on the display portion.

[3] The image forming apparatus as recited in the aforementioned mode [2], wherein, if the request for using the first function is issued via the entry portion, the function execution controller executes the first function as requested while the user authentication screen is not displayed on the display portion.

[4] The image forming apparatus as recited in the aforementioned mode [2] or [3], wherein: the second function consists of a plurality of features; and the authenticator performs user authentication for each of the features.

[5] The image forming apparatus as recited in any one of the aforementioned modes [1] to [4], wherein, if another request for using the function is issued after the function execution controller executes the function as requested, the authenticator validates continuous permission for the function without requiring user authentication.

[6] The image forming apparatus as recited in any one of the aforementioned modes [1] to [5], wherein the authenticator validates continuous permission for the function as many times as specified or for a specified period of time.

[7] The image forming apparatus as recited in the aforementioned mode [5] or [6], wherein, if a request for using a function other than the function whose continuous permission is validated by the authenticator is issued, the authenticator invalidates the continuous permission.

[8] The image forming apparatus as recited in the aforementioned mode [1], further comprising a password generator which, if the authenticator judges that the user authority information entered via the entry portion is appropriate for an authorized user for the function, generates a terminable password to give to the request issued by the authorized user, wherein, if receiving the terminable password, the authenticator validates permission for the function without requiring user authentication.

[9] The image forming apparatus as recited in the aforementioned mode [8], wherein, if a request for using a function other than the function whose permission is validated by the authenticator because of the terminable password, the password generator terminates the terminable password and generates a new terminable password in place of it.

[10] An operation control method for an image forming apparatus being capable of executing a plurality of functions, the operation control method comprising: allowing a user to issue a request for using any one of the functions and enter user authority information; requiring user authentication via a user authentication screen displayed on a display portion and judging whether or not the user authority information entered by the user is appropriate for an authorized user for the function; and executing the function as requested, if it is judged that the user authority information entered by the user is appropriate for an authorized user for the function, wherein the result of the user authentication is reset if execution of the function is successfully finished.

[11] A non-transitory computer-readable recording medium with an operation control program being stored thereon to make a computer of an image forming apparatus being capable of executing a plurality of functions execute: allowing a user to issue a request for using any one of the functions and enter user authority information; requiring user authentication via a user authentication screen displayed on a display portion and judging whether or not the user authority information entered by the user is appropriate for an authorized user for the function; and executing the function as requested, if it is judged that the user authority information entered by the user is appropriate for an authorized user for the function, wherein the result of the user authentication is reset if execution of the function is successfully finished.

According to the invention as described in the aforementioned mode [1], in order to use a function of the image forming apparatus, a user is required to enter information for user authentication via a user authentication screen displayed on the display. Then it is judged whether or not the information entered via the user authentication screen is appropriate for an authorized user for the function. The function is executed as requested, if it is judged that the information entered via the user authentication screen is appropriate for an authorized user for the function.

Therefore, even if an unauthorized third person issues another request for a function after an authorized user finishes using the function, user authentication is automatically performed and he/she will hardly be able to use the function, achieving the prevention of unauthorized use by a third person. Furthermore, even if an unauthorized user, who is asked to use only a particular function by an authorized user, issues a request for any function other than the particular function, user authentication is automatically performed and he/she will hardly be able to use the function, also achieving the prevention of unauthorized use by a unauthorized user.

In addition, the result of the user authentication is invalidated after the function execution controller successfully finishes executing a function as requested, and then even if receiving another request for the same function, user authentication is automatically performed again, contributing to the diminishment of the risk of unauthorized use.

According to the invention as described in the aforementioned mode [2], the image forming apparatus has a first function which unidentified users are permitted to use and a second function which only identified users are permitted to use; when a request for the second function is issued via the entry portion, the user authentication screen is displayed on the display portion.

According to the invention as described in the aforementioned mode [3], when a request for the first function is issued via the entry portion, the user is allowed to execute the first function without user authentication.

According to the invention as described in the aforementioned mode [4], the second function consists of a plurality of features; when a request for each of the features is issued via the entry portion, the user is required to enter information for user authentication for each of the features.

According to the invention as described in the aforementioned mode [5], if, after the function execution controller executes a function as requested, another request for the same function is issued, the user is continuously allowed to execute the same function without user authentication, contributing to the improvement of the convenience of users.

According to the invention as described in the aforementioned mode [6], the user is continuously allowed to execute the same function without user authentication, as many times as specified or for a specified period of time, contributing to the diminishment of the risk of unauthorized use.

According to the invention as described in the aforementioned mode [7], if, after the function execution controller executes a function as requested, a request for a different function is issued, the user is not continuously allowed to execute the different function and user authentication is automatically performed, contributing to the diminishment of the risk of unauthorized use.

According to the invention as described in the aforementioned mode [8], if it is judged that the information entered via the entry portion is appropriate for an authorized user for a function, a terminable password is generated and given to the request issued by the authorized user, and the user is allowed to execute the function whose permission is validated because of the terminable password.

According to the invention as described in the aforementioned mode [9], if a request for a different function is issued, the terminable password is terminated and a new terminable password is generated in place of it, achieving the prevention of unauthorized use by a third person.

According to the invention as described in the aforementioned mode [10], even if an unauthorized third person issues another request for a function after an authorized user finishes using the function, user authentication is automatically performed and he/she will hardly be able to use the function, achieving the prevention of unauthorized use by a third person.

According to the invention in the aforementioned item [11], the computer of the image forming apparatus achieves the prevention of unauthorized use.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus being capable of executing a plurality of functions that are different from each other, the image forming apparatus comprising:
    an entry portion which allows a user to issue a request for using any one of the functions and enter user authority information;
    a display portion; and
    a processor configured to:
    receive the request for using one of the functions, among the plurality of functions that are different from each other, from the user via the entry portion;
    require user authentication corresponding to the request via a user authentication screen displayed on the display portion for each requested function that is received;
    judge whether or not the user authority information entered via the entry portion is appropriate for an authorized user for the requested function based on stored use authority information indicating the user's authority for each function;
    execute the requested function when it is judged that the user authority information entered via the entry portion is appropriate for an authorized user for the requested function; and
    automatically reset a result of the user authentication for the requested function without user intervention once execution of the requested function has been successfully finished.

2. The image forming apparatus as recited in claim 1, having a first function which unidentified users are permitted to use; and a second function which only identified users are permitted to use, wherein when a request for using the second function is issued via the entry portion, the user authentication screen is displayed on the display portion.

3. The image forming apparatus as recited in claim 2, wherein, when a request for using the first function is issued via the entry portion, the processor is configured to execute the first function as requested while the user authentication screen is not displayed on the display portion.

4. The image forming apparatus as recited in claim 2, wherein:
the second function consists of a plurality of features; and
user authentication is performed for each of the features.

5. The image forming apparatus as recited in claim 1, wherein, when another request for using the function is issued after the requested function is executed, the processor is configured to validate continuous permission for the function without requiring user authentication.

6. The image forming apparatus as recited in claim 5, wherein the processor is configured to validate continuous permission for the function as many times as specified or for a specified period of time.

7. The image forming apparatus as recited in claim 5, wherein, when a request for using a function other than the function whose continuous permission is validated is issued, the processor is configured to invalidate the continuous permission.

8. An image forming apparatus being capable of executing a plurality of functions, the image forming apparatus comprising:
an entry portion which allows a user to issue a request for using a first function that is any one of the functions and enter user authority information;
a display portion; and
a processor configured to:
receive the request for using the first function from the user via the entry portion;
require user authentication corresponding to the request via a user authentication screen displayed on the display portion for the requested first function;
judge whether or not the user authority information entered via the entry portion is appropriate for an authorized user for each requested function based on use authority information indicating the user's authority for each function;
generate a first terminable password to give to the request issued by the authorized user when it is judged that the user authority information entered via the entry portion is appropriate for an authorized user for the requested first function;
validate permission for executing the requested first function without requiring user authentication based on the first terminable password password,
wherein when a request for using a second function other than the first function whose permission is validated because of the first terminable password, the first terminable password is terminated and a new terminable password as a second terminable password is automatically generated in place of the first terminated terminable password.

9. An operation control method for an image forming apparatus being capable of executing a plurality of functions that are different from each other, the operation control method comprising:
allowing a user to issue a request for using any one of the functions and enter user authority information;
receiving the request for using one of the functions, among the plurality of functions that are different from each other, from the user;
requiring user authentication corresponding to the request via a user authentication screen displayed on a display portion for each requested function that is received;
judging whether or not the user authority information entered by the user is appropriate for an authorized user for the requested function based on stored use authority information indicating the user's authority for each function;
executing the requested function when it is judged that the user authority information entered by the user is appropriate for an authorized user for the requested function; and
automatically resetting a result of the user authentication for the requested function without user intervention once execution of the requested function has been successfully finished.

10. A non-transitory computer-readable recording medium with an operation control program being stored thereon to make a computer of an image forming apparatus being capable of executing a plurality of functions execute the operation control method of claim 9.

11. An operation control method for an image forming apparatus being capable of executing a plurality of functions, the operation control method comprising:
allowing a user to issue a request for using a first function that is any one of the functions and enter user authority information;
receiving the request for using the first function from the user;
requiring user authentication corresponding to the request via a user authentication screen displayed on a display portion for the requested first function;
judging whether or not the user authority information entered by the user is appropriate for an authorized user for each requested function based on use authority information indicating the user's authority for each function;
generating a first terminable password to give to the request issued by the authorized user when is judged that the user authority information entered by the user is appropriate for an authorized user for the requested first function; and
validating permission for executing the requested first function without requiring user authentication based on the first terminable password password,
wherein when a request for using a second function other than the first function whose permission is validated because of the first terminable password, the first terminable password is terminated and a new terminable password as a second terminable password is automatically generated in place of the first terminated terminable password.

12. A non-transitory computer-readable recording medium with an operation control program being stored thereon to make a computer of an image forming apparatus being capable of executing a plurality of functions execute the operation control method of claim 11.

13. The image forming apparatus as recited in claim 1, wherein the user authentication information is a user name and a password.

14. The operation control method as recited in claim 9, wherein the user authentication information is a user name and a password.

* * * * *